(12) United States Patent
Schutzman et al.

(10) Patent No.: US 11,052,793 B2
(45) Date of Patent: Jul. 6, 2021

(54) VEHICLE SEAT ASSEMBLY WITH SEAT ACTUATION ASSIST MECHANISM

(71) Applicant: Toyota Motor Engineering & Manufacturing North America, Inc., Plano, TX (US)

(72) Inventors: Nicholas J. Schutzman, Ypsilanti, MI (US); Christopher M. Vargo, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/685,533

(22) Filed: Nov. 15, 2019

(65) Prior Publication Data

US 2021/0146810 A1  May 20, 2021

(51) Int. Cl.
  *B60N 2/30*  (2006.01)
(52) U.S. Cl.
  CPC ........... *B60N 2/3075* (2013.01); *B60N 2/309* (2013.01); *B60N 2/3011* (2013.01); *B60N 2/3065* (2013.01)
(58) Field of Classification Search
  CPC .. B60N 2/3075; B60N 2/3011; B60N 2/3065; B60N 2/309
  See application file for complete search history.

(56) References Cited

U.S. PATENT DOCUMENTS

| 4,156,523 A | 5/1979 | Bauer |
| 4,240,619 A | 12/1980 | Wirges et al. |
| 4,948,103 A | 8/1990 | Bowden et al. |
| 5,024,301 A | 6/1991 | Cook |
| 5,810,130 A | 9/1998 | McCandless |
| 6,199,820 B1 | 3/2001 | Ritchie |
| 6,241,209 B1 | 6/2001 | Von Mayenburg et al. |
| 6,375,255 B1 * | 4/2002 | Maruta ................ B60N 2/3011 296/65.01 |
| 6,401,886 B1 | 6/2002 | Liang |
| 6,626,274 B2 | 9/2003 | Pfundstein et al. |
| 7,073,862 B2 | 6/2006 | Lavoie |
| 7,425,019 B2 * | 9/2008 | Taylor ................ B60R 21/232 280/729 |
| 8,807,299 B2 | 8/2014 | Gagnon et al. |
| 2006/0097538 A1 * | 5/2006 | Villeminey .......... B60N 2/3075 296/65.09 |

(Continued)

FOREIGN PATENT DOCUMENTS

WO  2008026423 A1  3/2008
WO  2015161957 A1  10/2015

*Primary Examiner* — Jason S Morrow
(74) *Attorney, Agent, or Firm* — Christopher G. Darrow; Darrow Mustafa PC (57) ABSTRACT

A seat assembly for a vehicle includes a foldable seat actuatable at least to a stowed configuration and to a deployed configuration, The seat assembly also includes a seat actuation assist mechanism being structured to generate a seat actuation assist force facilitating a movement of the seat from any one of the stowed configuration and the deployed configuration to the other one of the stowed configuration and the deployed configuration. The assist force is generated responsive to movement of the seat from the other one of the stowed configuration and the deployed configuration to the one of the stowed configuration and the deployed configuration.

14 Claims, 9 Drawing Sheets

(56) References Cited

U.S. PATENT DOCUMENTS

| | | | |
|---|---|---|---|
| 2010/0308619 A1* | 12/2010 | Hoge | B60N 2/12 296/65.08 |
| 2015/0329019 A1* | 11/2015 | Abe | B60N 2/3009 296/65.09 |
| 2017/0240068 A1* | 8/2017 | Ramachandra | B60N 2/1615 |

* cited by examiner

VEHICLE SEAT ASSEMBLY WITH SEAT ACTUATION ASSIST MECHANISM

TECHNICAL FIELD

The subject matter described herein relates, in general, to foldable or stowable vehicle seats and, more particularly, to mechanisms for assisting movement of stowable vehicle seats between stowed and deployed configurations.

BACKGROUND

Foldable seats may be incorporated into vehicles (for example, in a cargo bed of a recreational vehicle) to provide additional seating capacity if needed. These seats may be foldable into a floor of the cargo bed to enable use of the space for cargo instead of additional vehicle occupants. A user may wish to stow a seat which is in a deployed configuration, or to deploy a seat which is currently in a stowed configuration. However, elements such as the static inertia and weight of the seat may inhibit movement of the seat when it is in one of the stowed configuration and the deployed configuration.

SUMMARY

In one aspect of the embodiments described herein, a seat assembly for a vehicle is provided. The seat assembly includes a foldable seat actuatable at least to a stowed configuration and to a deployed configuration, The seat assembly also includes a seat actuation assist mechanism structured to generate a seat actuation assist force facilitating a movement of the seat from any one of the stowed configuration and the deployed configuration to the other one of the stowed configuration and the deployed configuration. The assist force is generated responsive to movement of the seat from the other one of the stowed configuration and the deployed configuration to the one of the stowed configuration and the deployed configuration.

In another aspect of the embodiments described herein, a seat assembly for a vehicle is provided. The seat assembly includes a foldable seat actuatable at least to a stowed configuration and to a deployed configuration, and a seat actuation assist mechanism structured to generate seat actuation assist forces to assist in moving the seat from the stowed configuration to the deployed configuration and from the deployed configuration to the stowed configuration. The seat actuation assist mechanism includes a housing defining an interior of the housing, and a piston movably positioned in the housing interior so as to form a fluid-tight seal with the housing. A compressible fluid is confined within in the housing interior between the piston and a portion of the housing. At least one spring member is positioned in the housing interior. The piston is movable to a first position in which the piston compresses the compressible fluid to a full compression so as to generate a first assist force exerted on the piston by the compressible fluid, when the seat is in one of the stowed configuration and the deployed configuration. The piston is also movable to a second position in which the piston exerts a force on the at least one spring member so as to generate a second assist force exerted on the piston as a reaction force by the at least one spring member, when the seat is in the other one of the stowed configuration and the deployed configuration.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A seat assembly for a vehicle is disclosed. The seat assembly includes a foldable seat actuatable at least to a stowed configuration and to a deployed configuration. The seat assembly also includes a seat actuation assist mechanism structured to generate a seat actuation assist force facilitating a movement of the seat from any one of the stowed configuration and the deployed configuration to the other one of the stowed configuration and the deployed configuration. The assist force is generated responsive to movement of the seat from the other one of the stowed configuration and the deployed configuration to the one of the stowed configuration and the deployed configuration. In one of the stowed configuration and the deployed configuration, the seat actuation assist force is generated by compression of a gas stored in a chamber of a cylinder, by a piston moving within the cylinder. In the other one of the stowed configuration and the deployed configuration, the seat actuation assist force is generated by action of the moving piston on a spring member positioned within the cylinder. In one aspect, movement of the piston compresses the spring member to generate the seat actuation assist force. In another aspect, movement of the piston tensions the spring member to generate the seat actuation assist force. In embodiments where the seat actuation assist force is provided by compression or tension of the spring member, an additional, relatively small amount of assist force may be provided by the gas stored in the cylinder in an expanded state.

Figure 1A:
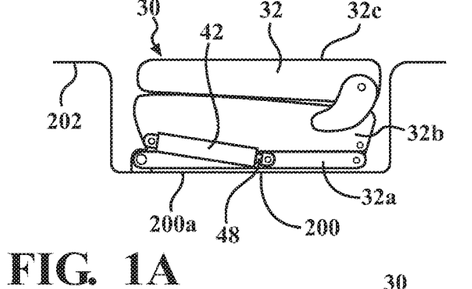
FIG. 1A is a schematic side view of an embodiment of a seat assembly for a vehicle, shown in a stowed configuration in a cavity formed in a floor of a vehicle cargo bed.
Figure 1B:
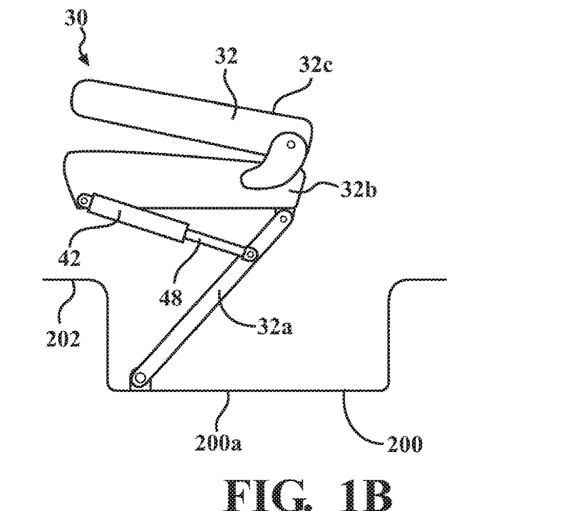
FIG. 1B is the schematic side view of FIG. 1A showing rotation of the base, bottom, and back portions the seat relative to each other as the seat is deployed.
Figure 1C:
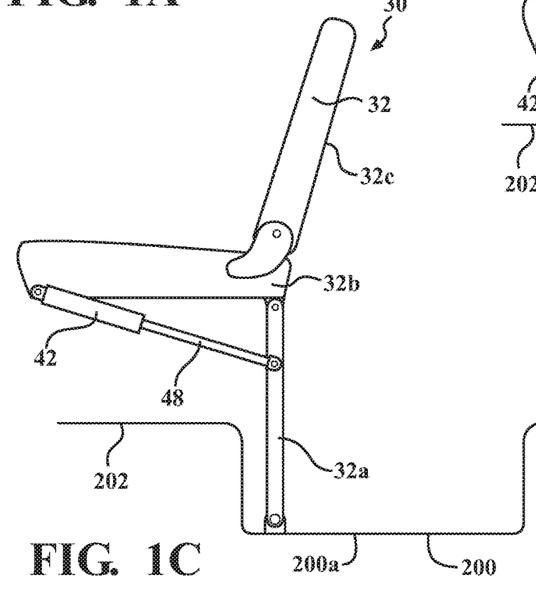
FIG. 1C is the schematic side view of FIG. 1A showing rotation of the portions of the seat to a further stage of deployment.
Figure 1D:
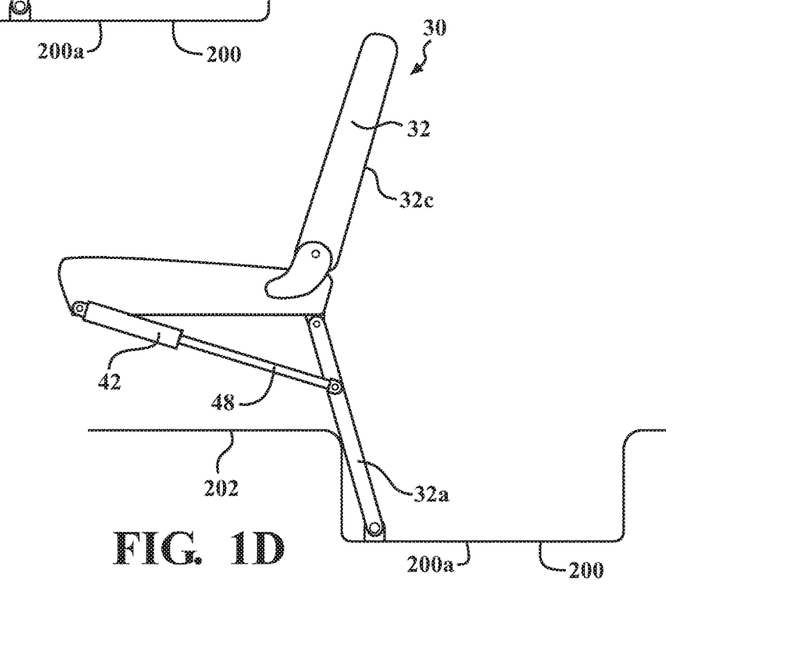
FIG. 1D is the schematic side view of FIG. 1A showing the portions of the seat when the seat is fully deployed.
Figure 2:
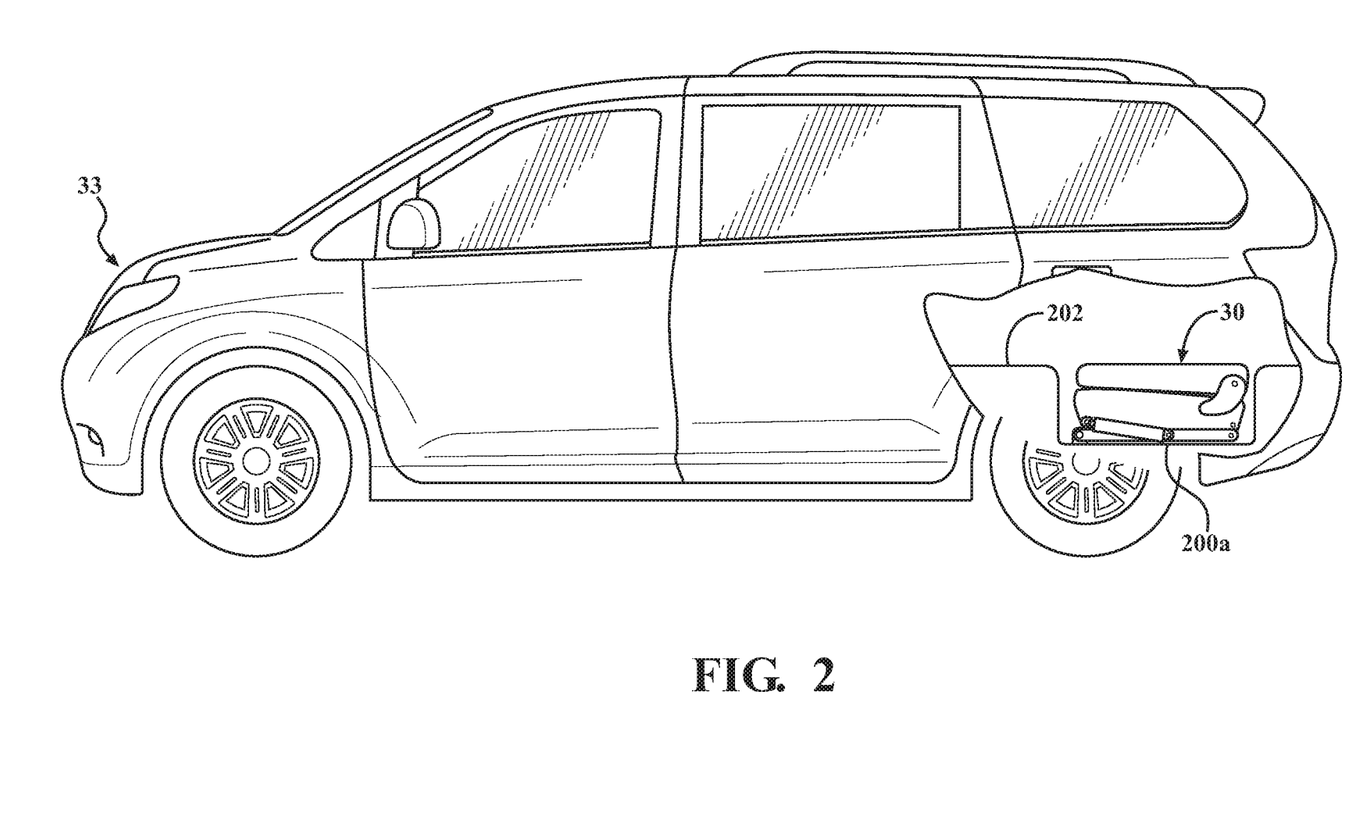
FIG. 2 is a schematic side cross-sectional view of a vehicle into which the seat of FIGS. 1A-1D may be incorporated.

FIGS. 1A-1D are schematic side views of an embodiment of a seat assembly 30 for a vehicle 33. FIG. 2 is a schematic side view of a vehicle incorporating an embodiment of a seat assembly as described herein. The seat assembly 30 may include a foldable vehicle seat 32. The seat 32 may be actuatable at least to a stowed configuration (FIG. 1A) and to a deployed configuration (FIG. 1D). In the stowed configuration, the seat 32 is in a folded condition for storage. In one or more arrangements, a cavity 200 may be provided in a floor 202 of the vehicle 33 into which the seat 32 may be folded in the stowed condition, thereby providing space on and above the vehicle floor usable for cargo stowage. In the deployed configuration, the seat is ready for use by a vehicle occupant.

The foldable seat 32 may have a seat base 32a, a seat bottom 32b, and a seat back 32c. Seat base 32a may be rotatably coupled to a floor of the vehicle. In the embodiment shown in FIGS. 1A-1D, seat base 32a is rotatably coupled to a floor 200a of the cavity 200 into which the seat 32 may be folded for stowage. However, the seat base 32a may alternatively be rotatably coupled to another portion of the vehicle 33. The seat base 32a may be structured to support the seat bottom 32b and seat back 32c when the seat is deployed, and also to support a vehicle occupant seated in the seat 32 when the seat is deployed. The seat bottom 32b may be rotatably coupled to the seat base 32a to enable the seat bottom 32b to be rotated to fold the seat 32 into a stowable configuration.

The seat bottom 32b may be structured with respect to seat base 32a to support the buttocks and upper legs of a vehicle occupant seated in the seat 32 in a known manner when the seat 32 is deployed. The seat base 32a and/or seat bottom 32b may be provided with a locking mechanism (not shown) which enables the seat bottom 32b to be locked in a horizontal (or near-horizontal) occupant support orientation when the seat 32 is in the deployed configuration.

The seat back 32c may be rotatably coupled to the seat base 32a and/or to the seat bottom 32b to enable the seat back 32c to be rotated to fold the seat 32 into a stowable configuration. The seat back 32c may be structured to support the back of a vehicle occupant seated in the seat 32 in a known manner when the seat 32 is deployed. The seat back 32c may be provided with a locking mechanism (not shown) for locking the seat back 32c in an upright occupant support orientation when the seat 32 is in the deployed configuration.

FIGS. 1B and 1C show intermediate configurations of the vehicle seat 32 as the seat is moved from stowage (FIG. 1A) to deployment (FIG. 1D) and from deployment to stowage. In FIG. 1B, to deploy the vehicle seat 32, the portions 32a-32c of the seat 32 are rotated with respect to cavity floor 200a to raise the seat 32 from the cavity floor. Seat bottom 32b may be rotated upwardly with respect to seat base 32a, and seat back 32c may be rotated upwardly with respect to seat bottom 32b and seat base 32a. Rotation of the portions of the seat 32 may continue as shown in FIG. 1C until the seat is in the deployed configuration shown in FIG. 1D. The seat 32 may be structured to be maintainable in the deployed configuration by the weight distribution of the portions of the seat when the portions of the seat are in their deployed orientations and positions. If desired, one or more suitable locking mechanism(s) may be provided for locking one or more of the seat portions 32a-32c in their respective deployed orientations, until the locking mechanism(s) are disengaged to enable the seat to be folded and stowed.

Referring now to FIGS. 3A-3D in conjunction with FIGS. 1A-1D, the seat assembly 30 may also include a seat actuation assist mechanism structured to be operable to generate a seat actuation assist force. "Actuation" of the seat 32 is defined herein as any movement of the seat from the stowed configuration to the deployed configuration, and also any movement of the seat from the deployed to the stowed configuration. In one or more arrangements, movement of the seat from the deployed configuration to the stowed configuration and/or from the stowed configuration to the deployed configuration may be performed manually, by a human user. Alternatively, the movement of the seat from the deployed configuration to the stowed configuration and/or from the stowed configuration to the deployed configuration may be performed or assisted by an automated seat movement mechanism (i.e., a mechanism other than a human user or the seat actuation assist mechanism) (not shown) which may be activated either manually or autonomously (for example, responsive to sensor data). An "actuation assist force" is defined as a force which is generated by the seat actuation assist mechanism and which facilitates a movement of the seat from any of the stowed configuration to the deployed configuration and from the deployed configuration and the stowed configuration.

FIGS. 3A-3D are schematic side cross-sectional views of one embodiment 40 of the vehicle seat actuation assist mechanism. Referring to FIGS. 3A-3D, in one or more arrangements, the seat actuation assist mechanism 40 may include a housing 42 having a first end closure 42a, a second end closure 42b positioned opposite the first end closure, and a wall 42c extending between the first and second end closures. The end closures 42a, 42b and wall 42c may combine to define an interior 42d of the housing 42. In one or more arrangements, the housing 42 may be in the form of a cylinder structured for containing therein a quantity of a compressible fluid such as a gas, with first end closure 42a and second end closure 42b forming gas-tight seals with wall 42c.

A piston 44 may be slidably or otherwise movably positioned in the housing interior 42d and structured to form a fluid-tight seal with the housing wall 42c. The piston 44 may separate the housing interior 42d into a first chamber 42g extending between the first end closure 42a and the piston 44, and a second chamber 42h extending between the second end closure 42b and the piston 44. The volumes of the first and second chambers 42g, 42h may change as the piston 44 moves within housing 42.

A quantity of a compressible fluid 46 (such as a gas) may be confined within in the first chamber 42g. The internal pressure in fluid 46 may be varied by motion of piston 44 within the housing 42, the pressure increasing as the piston 44 moves toward the first end closure 42a, and the pressure decreasing as the piston 44 moves toward the second end closure 42b.

A shaft or rod 48 may be connected to piston 44. Shaft 48 may extend from the housing interior 42d to an exterior of the housing 42, to enable forces operating on the piston 44 within housing 42 to be transferred to an element or mechanism outside the housing 42. An opening 42e may be provided in second end closure 42b to enable passage of the shaft 48 therethrough. A first end 48a of the shaft may be connected to piston 44, and a second end 48b of the shaft opposite the first end may be structured for connection to a portion of the seat 32 other than the portion of the seat to which the housing is connected (as shown in FIGS. 1A-1D, 4, and 3A-3D), or connection to a portion of the vehicle 33. For example, in FIG. 4 the shaft 48 is rotatably connected to a bracket 49 forming a part of the seat base 32a. This enables the shaft 48 to move in and out of the housing 42 as the seat is moved between the stowed and deployed configurations.

At least one spring member 50 may be positioned in the housing interior 42d. In the embodiment shown in FIGS. 3A-3D, spring member 50 is positioned in the second chamber 42h. A first end 50a of spring member 50 may be structured to be biased against second end closure 42b. The seat actuation assist mechanism 40 may be structured so that piston 44 is spaced apart a predetermined distance d1 from a second end 50b of the spring member 50 when the piston 44 has fully compressed the fluid 46 to maximum pressure. The seat actuation assist mechanism 40 may also be structured so that piston 44 is spaced apart a predetermined distance e1 from the first end closure 42a when the piston 44 has fully compressed the fluid 46 to maximum pressure (i.e., the piston 44 is at its point of closest approach to first end closure 42a). Spring member 50 may be a coil spring member of any other suitable type of spring member.

FIGS. 1A-1D show shaft 48 connected to a portion of the seat 32 and housing 42 connected to another portion of the seat. FIGS. 1A-1D also show extension and retraction of the shaft 48 from the housing 42 as described herein, as the seat 32 moves between the stowed and deployed configurations.

In one or more arrangements described herein, housing 42 may be directly connected or otherwise operatively coupled to the foldable seat 32, and piston 44 may be directly connected or otherwise operatively coupled to one of the foldable seat 32 and a portion of the vehicle 33 in which the foldable seat 32 is installed. In other arrangements described herein, piston 44 may be operatively coupled to the foldable seat 32, and housing 42 may be directly connected or otherwise operatively coupled to one of the foldable seat 32 and a portion of the vehicle 33 in which the foldable seat 32 is installed. The "portion of a vehicle in which the foldable seat is installed" and to which a portion of the seat actuation assist mechanism may be operatively coupled may be any suitable portion of the vehicle other than the foldable seat 32, or any suitable portion of the vehicle separate from the foldable seat 32 and the seat actuation assist mechanism 40.

Connections of the actuation assist mechanism 40 to the seat 32 and/or to a portion of the vehicle 33 may be structured to enable rotation of the shaft 48 and housing 42 with respect to the portions of the seat and/or vehicle to which they are connected, to facilitate movement of the seat between the stowed and deployed configurations. In order for the actuation assist mechanism 40 to function as described herein, the actuation assist mechanism should be connected to the seat 32 (or to the seat 32 and vehicle 33) such that the shaft 48 moves with respect to the housing 42 so as to extend from (and retract into) the housing 42 as the seat 32 moves between the stowed configuration and the deployed configuration.

As used herein, the term "full compression" of the fluid 46 refers to the compression of the fluid when the piston 44 is at its location of closest approach to the housing first end closure 42a (residing along a plane R1 spaced apart from the first end closure 42a), for an available stroke length of the piston 44 and shaft 48 of a given design of actuation assist mechanism 40. At full compression, the fluid 46 may have the maximum internal pressure provided in a given design. Thus, at this location of the piston 44, the maximum available reaction force due to fluid pressure will be acting on piston 44. Also, as used herein, the term "full compression" of the spring member 50 refers to the compression of the spring member when the piston 44 is at its location of closest approach (residing along a plane R2 spaced apart from the second end closure 42b) to the housing second end closure 42b, for the available stroke length of the piston 44 and shaft 48 of a given design of actuation assist mechanism. At full compression of the spring member 50, the maximum available reaction force due to spring member compression will be acting on piston 44. Thus, the stroke length of the shaft 48 during movement of the seat 32 between the stowed and deployed configurations may be the distance between reference plane R1 (at a location of the piston 44 where the fluid 46 is at full compression) and reference plane R2 (at a location of the piston 44 where the spring member 50 is at full compression).

A user may wish to stow a foldable seat 32 which is in a deployed configuration, or to deploy the foldable seat when it is in a stowed configuration. Elements such as static inertia and the weight of the seat may inhibit movement of the seat when it is in one of the stowed configuration and the deployed configuration. The assist force provided by the actuation assist mechanism 40 may reduce the initial force required to start the seat moving from a static condition (either from the stowed configuration or the deployed configuration).

The seat actuation assist mechanism 40 may be structured so that a movement of the seat 32 from one of the stowed configuration and the deployed configuration to the other one of the stowed configuration and the deployed configuration causes the piston 44 to compress the compressible fluid 46 so as to generate a first assist force exerted on the piston 44 by the compressible fluid 46. The first assist force may facilitate a movement of the seat 32 from the other one of the stowed configuration and the deployed configuration to the one of the stowed configuration and the deployed configuration, after the seat 32 has been moved to the other one of the stowed configuration and the deployed configuration.

The seat actuation assist mechanism 40 may also be structured so that a movement of the seat 32 from the other one of the stowed configuration and the deployed configuration to the one of the stowed configuration and the deployed configuration causes the piston 44 to act on the spring member 50 so as to generate a second assist force exerted on the piston 44 by the spring member 50. The second assist force may facilitate a movement of the seat 32 from the one of the stowed configuration and the deployed configuration to the other one of the stowed configuration and the deployed configuration, after the seat 32 has been moved to the one of the stowed configuration and the deployed configuration.

FIGS. 1A-1D and 3A-3D show an example of operation of one embodiment of the actuation assist mechanism. In the following example, the seat 32 starts in the stowed condition shown in FIG. 1A. In addition, both the housing 42 and the piston 44 (through shaft 48) are connected to portions of the seat 32 as shown in FIG. 4.

Figure 3A:
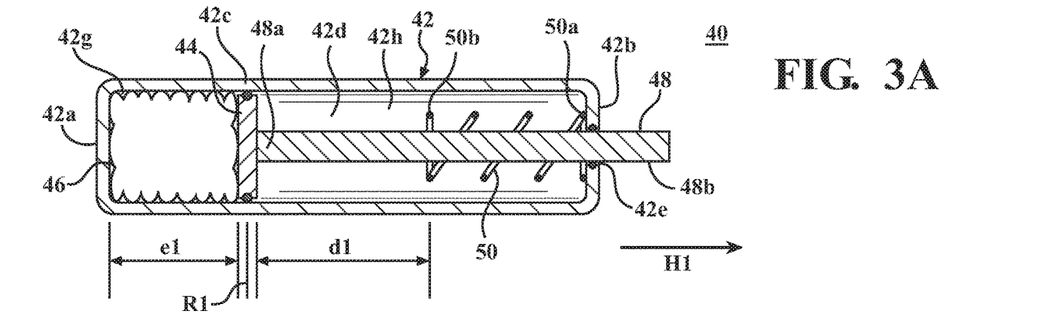
FIG. 3A is a schematic cross-sectional view of an actuation assist mechanism in accordance with one embodiment described herein, and showing a compressible fluid of the actuation assist mechanism at full compression prior to initiating movement of the seat from the stowed configuration to the deployed configuration, and when the compressed fluid is generating the maximum assist force which may be generated by compressing the fluid.

Referring to FIGS. 1A-1D and 3A-3D, when the seat 32 is in the stowed configuration shown in FIG. 1A, the actuation assist mechanism 40 may be in the configuration shown in FIG. 3A. The seat 32 may be retained in the stowed condition by gravity. In FIG. 3A, the fluid 46 is at full compression and shaft 48 is at full retraction within the housing 42. Thus, the reaction force on the piston 44 due to fluid pressure is at maximum for a given design of the actuation assist mechanism 40. This reaction force tends to operate against the stowed condition of the seat 32 and against gravity. The pressure of any fluid in the second chamber 42h may be much less than the pressure of the compressed fluid in the first chamber 42g. For example, any fluid (such as ambient air) in the second chamber 42h may be at standard atmospheric pressure, if the second chamber 42h is exposed to the ambient atmosphere by an opening provided in housing wall 42c. Thus, the actuation assist mechanism 40 may be structured so that the pressure differential between the first and second chambers 42g, 42h is sufficient to exert a substantial net force acting in a direction H1 toward the second end closure 42b. Therefore, when a user lifts the seat 32 to move the seat toward a deployed configuration, the fluid reaction force acts as an assist force, aiding the user in lifting the seat 32 by reducing the amount of force the user needs to apply to move the seat from the stowed configuration.

Figure 3B:
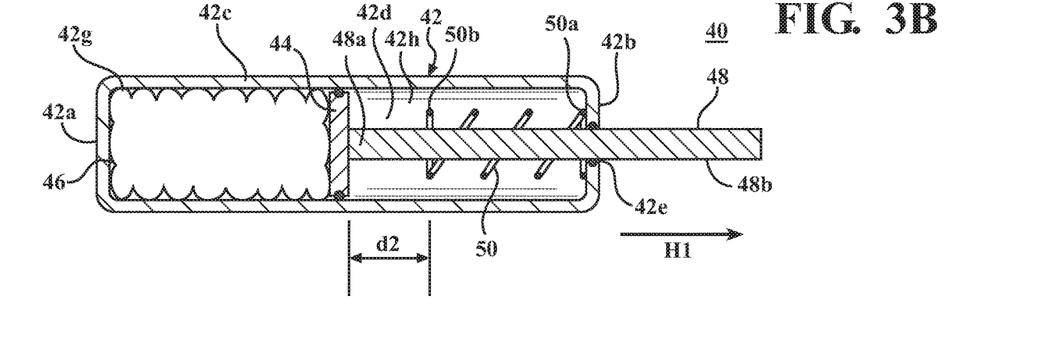
FIG. 3B is the view of FIG. 3A showing movement of a piston and shaft of the actuation assist mechanism after initiating movement of the seat from the stowed configuration to the deployed configuration, and prior to contact between the piston and a spring member of the actuation assist mechanism.
Figure 4:
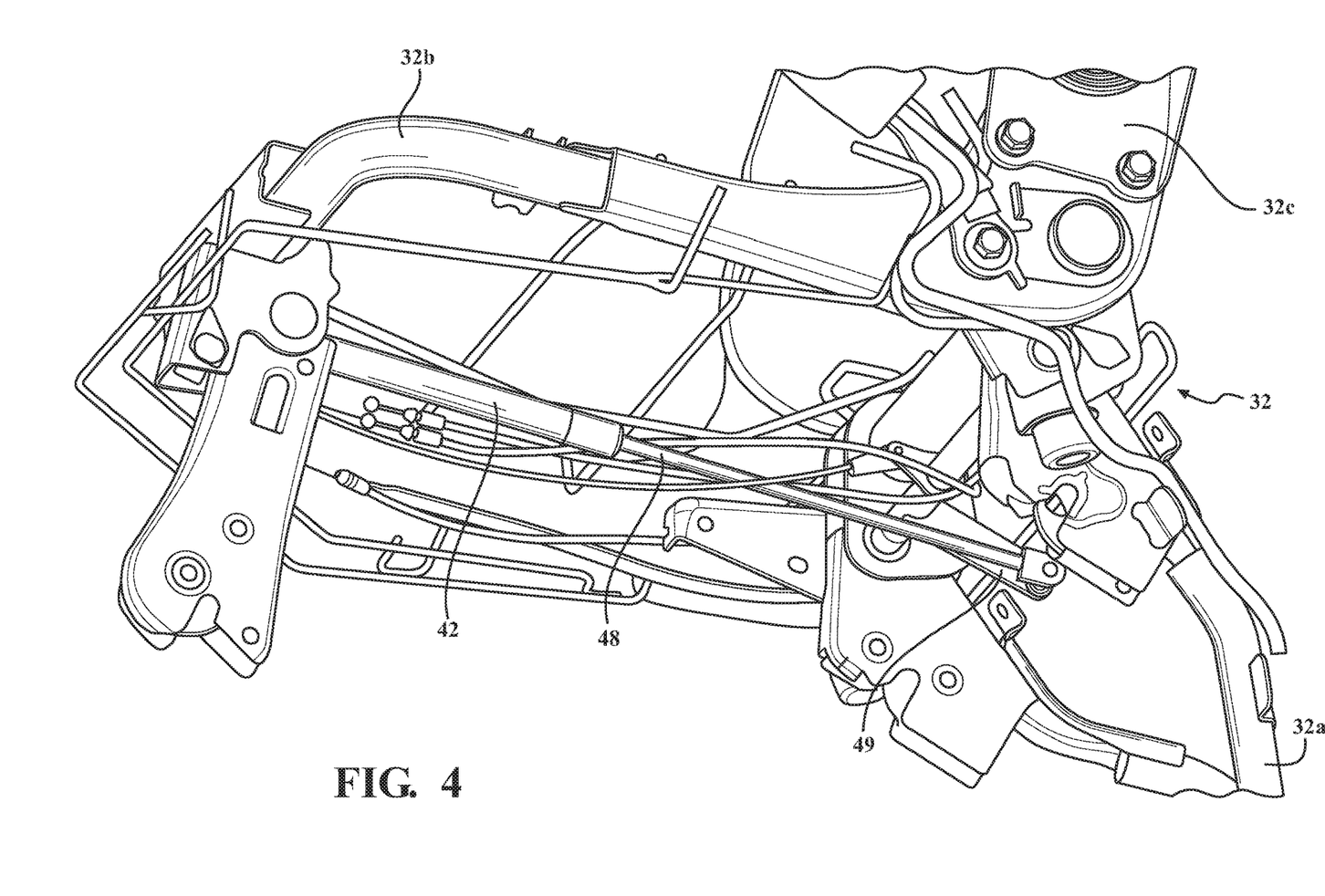
FIG. 4 is a partial perspective view of a seat embodiment structured as shown in FIGS. 1A-1D showing connection of an embodiment of the actuation assist mechanism to the seat, at a housing and a shaft of the actuation assist mechanism.

Referring to FIGS. 1B and 3B, as the user moves the seat 32 from the stowed configuration, the shaft 48 further extends from the housing 42. This moves the piston 44 toward the spring member 50 to a distance d2 less than distance d1 from the spring member, thereby reducing the pressure in fluid 46. Seat back 32c and seat bottom 32b rotate with respect to seat base 32a.

Figure 3C:
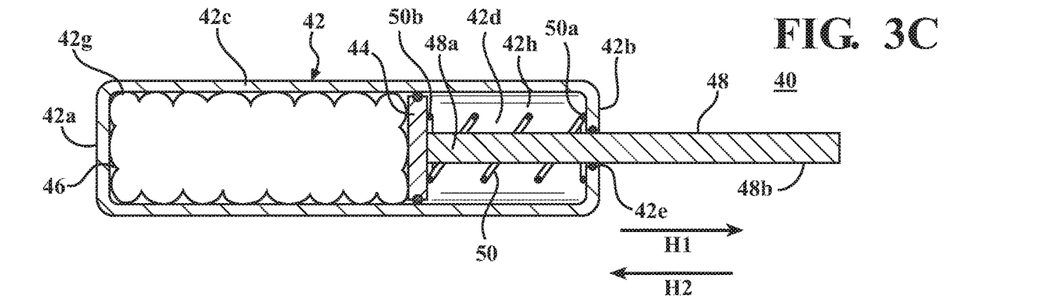
FIG. 3C is the view of FIG. 3A showing the actuation assist mechanism when the piston makes contact with the spring member and begins to compress the spring member.

Referring to FIGS. 1C and 3C, as the user continues to move the seat 32 from the stowed configuration toward the deployed configuration (shown in FIG. 1D), the shaft 48 has extended further from the housing 42 and the piston 44 attached to the shaft 48 comes into contact with the spring member second end 50b. At this point, further movement of the piston 44 toward the second end closure 42b begins to compress the spring member 50, thereby initiating the generation of a reaction assist force in direction H2.

Figure 3D:
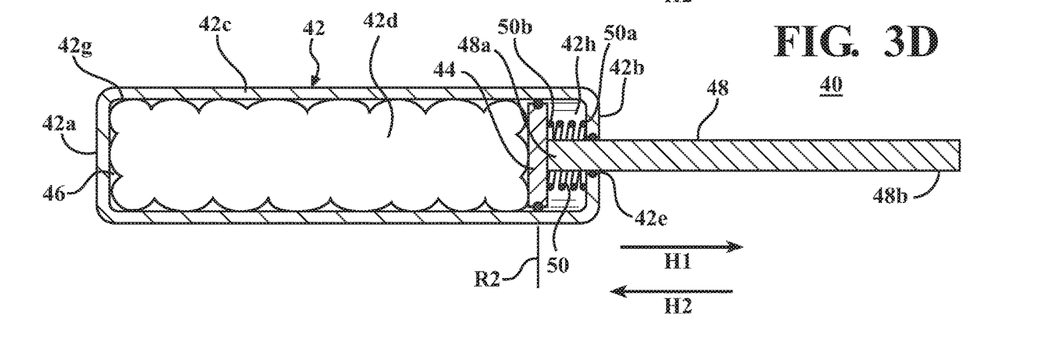
FIG. 3D is the view of FIG. 3A showing the spring member at full compression, when the spring member is generating the maximum assist force which may be generated by the spring member.

Referring to FIGS. 1D and 3D, as the user continues to move the seat 32 from the stowed configuration toward the deployed configuration, spring member 50 continues to compress, causing the reaction force generated by the spring member 50 on the piston 44 in direction H2 to increase. Because this force acts against the movement of the seat to the deployed configuration, the force will act to aid in moving the seat 32 from the deployed configuration to the stowed configuration when the user moves to stow the seat. In this manner, movement of the seat 32 from the stowed configuration to the deployed configuration generates an assist force which aids in moving the seat 32 from the deployed configuration back to the stowed configuration.

FIG. 1D shows the seat 32 in the deployed configuration. The seat may be structured to be maintainable in this configuration by weight distribution of the portions of the seat when the seat is deployed. For example, seat base 32a may lean forwardly as shown with respect to its connection to the cavity floor 200a and the seat bottom 32b may extend forwardly from an end of the seat base 32a, thereby providing a force moment tending to maintain the seat 32 in the deployed configuration unless moved by a user.

In moving the seat 32 back to the stowed configuration, the user reverses the procedure just described and shown in FIGS. 1A-1D and 3A-3D. As the seat 32 moves from the deployed configuration, shaft 48 starts to retract back into the housing 42 and piston 44 starts to move toward first end closure 42a. As the piston 44 moves toward the first end closure 42a, the pressure in fluid 46 increases while the compression of the spring member 50 decreases, thereby reducing the force exerted by the spring member. Further movement of the piston toward the first end closure 42a disengages the piston 44 from contact with the spring member 50 and compresses the fluid 46 until the state shown in FIGS. 1A and 3A is reached, at which point the seat 32 is again stowed.

It will be realized that, as an alternative to the arrangement just described, the actuation assist mechanism 40 may be installed such that the full spring compression occurs when the seat 32 is in the stowed configuration rather than in the deployed configuration, and such that the full compression of the fluid 46 occurs when the seat 32 is in the deployed configuration rather the stowed configuration.

In one or more arrangements described herein, the fluid 46 may be at full compression with no compression force exerted on spring member 50 when the seat 32 is stowed. In such arrangements, the fluid 46 may be at minimum pressure and the spring member 50 may be at full compression when the seat 32 is deployed. In other arrangements described herein, the spring member 50 may be at full compression and the fluid 46 at minimum pressure when the seat 32 is stowed. In such arrangements, the fluid 46 may be at full compression with no compression force exerted on spring member 50 when the seat 32 is deployed. These conditions will depend on how the actuation assist mechanism 40 is connected to the seat 32 and/or to the vehicle (i.e., on which portion of the actuation assist mechanism (housing or piston/shaft) is connected to the seat 32, and on which portion of the actuation assist mechanism 40 is connected to another portion of the seat 32 or to the vehicle.

The distances el and d1 (FIG. 3A) and other seat actuation assist mechanism design parameters may depend on such factors as the desired pressure of the fluid 46 under maximum compression by the piston 44, the amount of space available for the shaft 48 to move extend from and retract into housing 42 during deployment and stowage of the seat, the length of the spring member 50, the distance separating the attachment locations of the seat actuation assist mechanism 40 to the seat 32 and/or vehicle, and other pertinent factors. Values for these parameters may be determined and/or optimized for a given seat and vehicle design according to the requirements of a particular application.

Figure 5:
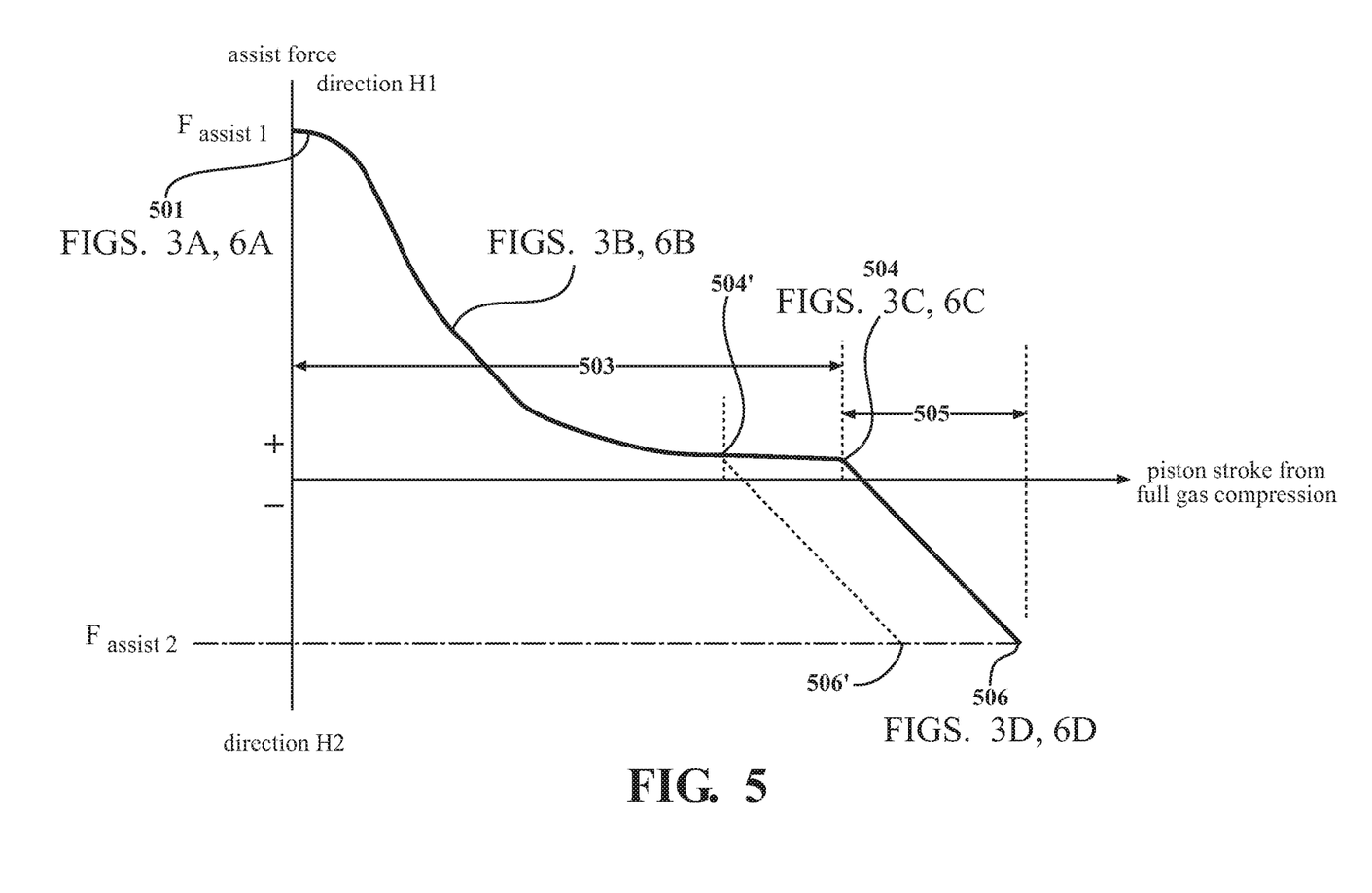
FIG. 5 is a plot showing schematically and qualitatively the forces generated by the actuation assist mechanism when the seat is in the stowed and deployed configurations, and during transition between the stowed and deployed configurations.

FIG. 5 is a plot showing schematically and qualitatively the forces generated by the actuation assist mechanism as previously described with respect to FIGS. 3A-3D, as a function of the seat configuration and the position of the piston within the housing 42. Using an embodiment as shown in FIGS. 1A-1D as an example, at location 501 on the plot, the seat 32 may be stowed as shown in FIG. 1A and the fluid 46 may be at full compression as shown in FIG. 3A. All of the assist force (in direction H1) may be generated by the compressed gas acting on piston 44 in direction H1. During region 503, the piston 44 moves from location R1 (FIG. 3A) toward the second end closure 42b, thereby reducing fluid pressure and assist force as shown in FIG. 5. At location 504 on the plot (corresponding to the assist mechanism state of FIG. 3C), the piston 44 contacts the spring member 50. As seen in FIG. 5, a small amount of gas pressure may still exert a relatively small assist force in direction H1 when the piston contacts the spring member 50. In region 505, the piston 44 compresses the spring member 50, which generates a reaction force against the piston 44 acting in the opposite direction (H2) of the fluid compression force acting at location 501. FIG. 5 shows the assist force as it reverses direction in region 505. At location 506 on the plot, the spring member 50 is at full compression and exerts the maximum amount of reaction force it may exert on the piston 44 for a given design. A small amount of gas pressure may still be exerted in direction H1 when the spring member 50 is at full compression. However, a much larger, net force in direction H2 is exerted by compressed spring member 50.

FIGS. 6A-6D are schematic cross-sectional views of an actuation assist mechanism 140 in accordance with another embodiment of the invention. The actuation assist mechanism shown 140 in FIGS. 6A-6D has a different arrangement of the spring member 150 within housing 42. Specifically, the compressible fluid 46 in FIGS. 6A-6D is positioned in the housing interior 42d on a first side of the piston 44 in first chamber 42g, and the spring member 150 is also positioned in the housing interior 42d on the first side of the piston 44. The spring member 150 may be connected to the piston 44 and to a portion of the housing 42 (such as the first end closure 42a) and is structured to be unstretched between the piston 44 and the portion of the housing 42 to which it is connected when the piston 44 is compressing the compressible fluid 46 as previously described, so as to generate the first assist force. The spring member 150 may be structured to stretch between the piston 44 and the portion of the housing 42 to which it is connected after a movement of the piston 44 a predetermined distance in a direction away from the portion of the housing, so as to generate the second assist force. The embodiment of the actuation assist mechanism 140 shown in FIGS. 6A-6D may operate in basically the same manner as the embodiment shown in FIGS. 3A-3D, but with the spring member 150 operating in tension instead of compression.

Figure 6A:
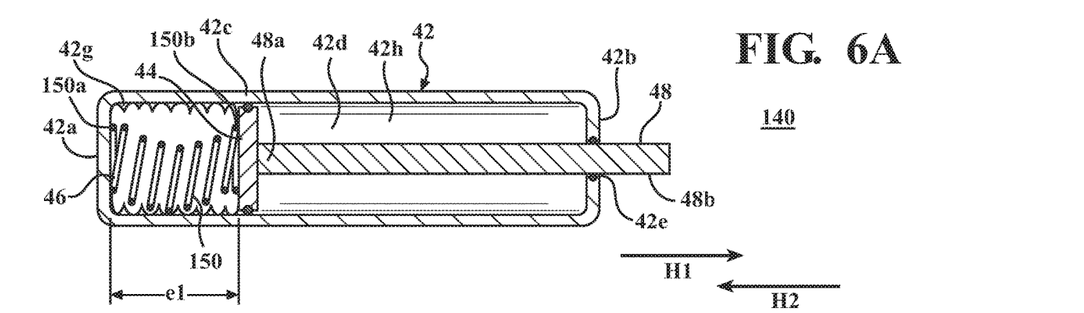
FIG. 6A is a schematic cross-sectional view of an actuation assist mechanism in accordance with another embodiment described herein, and showing a compressible fluid of the actuation assist mechanism at full compression prior to initiating movement of the seat from the stowed configuration to the deployed configuration, and when the compressed fluid is generating the maximum assist force which may be generated by compressing the fluid.

Referring to FIG. 6A, a spring member first end 150a may be connected to the first end closure 42a (or to another suitable portion of the housing 42) and a spring member second end 150b may be connected to piston 44. With the seat 32 in the stowed configuration, the fluid 46 may be at full compression as previously described with respect to FIG. 3A, with spring member 150 in an unstretched state. As in FIG. 3A previously described, piston 44 may be spaced apart a predetermined distance el from the first end closure 42a when the piston 44 has fully compressed the fluid 46 to maximum pressure (i.e., the piston 44 is at its point of closest approach to first end closure 42a). The spring member 150 is considered to be "unstretched" when the spring member does not exert any reaction forces due to axial stretching of the spring. Rather, the only forces exerted by the spring member 150 may be due to the weight of the spring member when freely suspended between connection points at the spring member ends. The spring member 150 is considered to be "uncompressed" when the spring member does not exert any reaction forces due to axial compression of the spring.

Figure 6B:
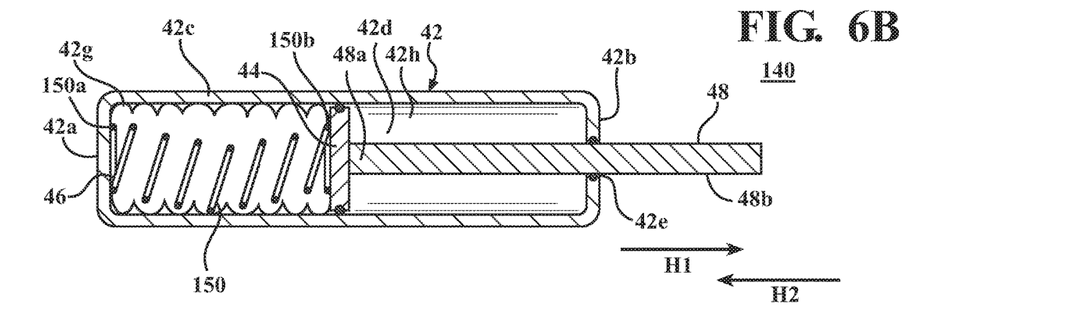
FIG. 6B is the view of FIG. 6A showing movement of a piston and shaft of the actuation assist mechanism after initiating movement of the seat from the stowed configuration to the deployed configuration, and prior to stretching of the spring member by movement of the piston.

In FIG. 6B, as the user moves the seat 32 from the stowed configuration toward the deployed configuration as previously described, the piston 44 moves toward the second end closure 42b, also moving the second end 150b of the spring member 150 attached to the piston 44.

Figure 6C:
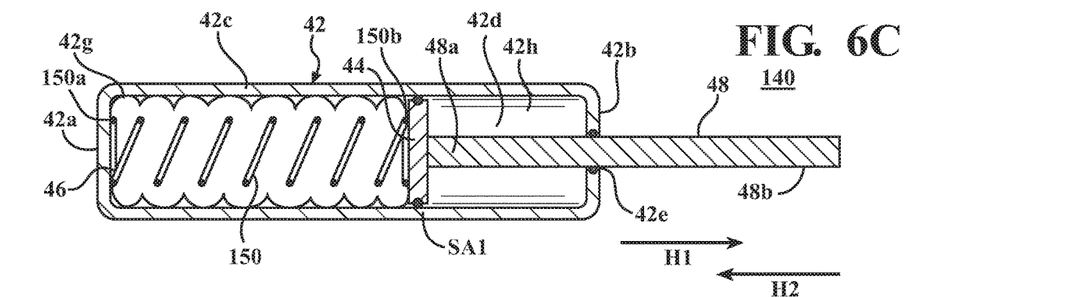
FIG. 6C is the view of FIG. 6A showing the actuation assist mechanism when the piston has moved to a location where further movement will begin to stretch the spring member.

In FIG. 6C, further movement of the piston 44 toward the second end closure 42b has moved the second end 150b of the spring member 150 to a location SA1 within the housing 42 where the slack has been removed from the spring and where further movement of the piston 44 toward the second end closure 42b will begin to stretch the spring member 150. The length and force deflection characteristics of the spring member 150 may be specified so as to enable the spring member to remain unstretched until the piston has moved a desired predetermined distance from its "full fluid compression" position toward the second end closure, or otherwise until the piston has moved to a predetermined location within the housing. When the spring member 150 begins to stretch, the actuation assist mechanism 140 begins to generate a reaction force which will aid a user in returning the seat 32 to the stowed configuration, as previously described. Thus, the actuation assist force provided by the spring member 150 does not begin to be generated until movement of the piston begins to tension the spring past its "at rest" or unstretched condition.

Figure 6D:
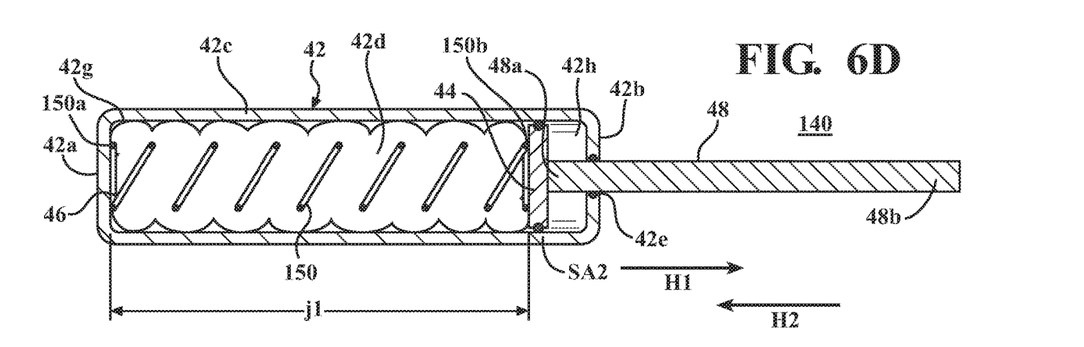
FIG. 6D is the view of FIG. 6A showing the spring member fully stretched (i.e., at full extension), when the spring member is generating the maximum assist force which may be generated by the spring member.

Referring to FIG. 6D, continued movement of the piston 44 toward the second end closure 42b will continue to stretch the spring member 150 until a fully stretched length of the spring member 150 within the housing is reached. At location SA2 in the housing, the piston has reached its point of closest approach to the second end closure 42b and the spring member 150 is stretched to the maximum a given design of the actuation assist mechanism. At this point, the spring member 150 is generating a maximum reaction force in direction H2 for a given design of the actuation assist mechanism 140. When the spring member 150 is at full extension, the piston 44 may be spaced apart a distance j1 from the first end closure 42a. The properties (i.e., length, force-deflection characteristics, etc.) of the spring member 150 may be specified so that the maximum length to which the spring will be stretched is less than the length of the housing interior, so that the spring member 150 may stretch to the length needed for a given application.

The plot of FIG. 5 also shows schematically and qualitatively the forces generated by the actuation assist mechanism as previously described with respect to FIGS. 6A-6D, as a function of the seat configuration and the position of the piston within the housing 42. Referring to FIGS. 6A-6D, and again using an embodiment as shown in FIGS. 1A-1D as an example, at location 501 on the plot, the seat 32 may be stowed as shown in FIG. 1A and the fluid 46 may be at full compression as shown in FIG. 6A. In FIG. 6A, the spring member 150 may be untensioned and all of the assist force may be generated by the compressed gas acting on piston 44 in direction H1. During region 503 of the plot (corresponding to FIG. 6B), the piston 44 moves in direction H1 toward the second end closure 42b, thereby reducing fluid pressure and assist force in firection H1 as shown in FIG. 5. During this movement, the spring member 150 may remain untensioned. At location 504 on the plot (corresponding to FIG. 6C), piston 44 may reach a location where further motion will start to stretch spring member 150. As seen in FIG. 5, a small amount of gas pressure may still be exerted in direction H1 when the piston begins to tension the spring member 150.

The stretching of spring member 150 increases in region 505 as the piston proceeds in direction H1 further toward the second end closure 42b. In span 505, further movement of the piston 44 in direction H1 increases tension in the spring member 150 which increases a reaction force against the piston 44 acting in the opposite direction (H2) of the fluid compression force acting at location 501, thereby generating an increasing assist force in the direction H2. FIG. 5 shows the assist force as it reverses direction in region 505. At location 506 on the plot, the spring member 150 is at full extension and exerts the maximum amount of reaction force it may exert on the piston 44 for a given design. A small amount of gas pressure may still be exerted in direction H1 when the spring member 150 is at full compression. However, a much larger, net force in direction S2 is exerted by the tensioned spring member 150.

The mechanism characteristics (such as internal gas pressure, spring member properties, etc.) may be tailored so that the maximum magnitude of the assist force $F_{assist\ 1}$ generated by the assist mechanism in direction H1 may be equal or substantially equal (within tolerance limits of ±10 lbs., for example) to the maximum magnitude of the assist force $F_{assist2}$ generated by the assist mechanism in direction H2. Alternatively, the mechanism characteristics may be tailored so that the maximum magnitude of the assist force $F_{assist\ 1}$ generated by the assist mechanism in direction H1 is different from the maximum magnitude of the assist force $F_{assist\ 2}$ generated by the assist mechanism in direction H2, by a predetermined amount.

Depending on the design parameters for a particular application, the design shown in FIGS. 6A-6D may require less space than the design shown in FIGS. 3A-3D, because the spring member 150 occupies the same space (in first chamber 42g) that is occupied by the fluid 46. The force plot shown in FIG. 5 is also applicable to the embodiment shown in FIGS. 6A-6D.

FIGS. 7A-7D are schematic side views similar to the views shown in FIGS. 1A-1D, showing operation of another embodiment 230 of the seat assembly similar to seat assembly 30 previously described where one portion of the actuation assist mechanism 40 (for example, the housing 42) is connected to a portion of the seat 32 at a location 190, and another portion of the actuation assist mechanism 40 (for example, shaft 48) is connected to a portion of the vehicle 33 (for example, the cavity floor 200a) at a location 192. FIGS. 7A-7D show the shaft 48 attached to the cavity floor 200a and housing 42 attached to a portion of the seat 32. Otherwise, the actuation assist mechanism embodiment 40 shown in FIGS. 7A-7D may have the same structure as shown in FIGS. 3A-3D and may operate in a manner as previously described. Alternatively, the actuation assist mechanism may have a structure as shown in FIGS. 6A-6D, and may operate in a manner as previously described.

Figures 7A, 7B, 7C, 7D:
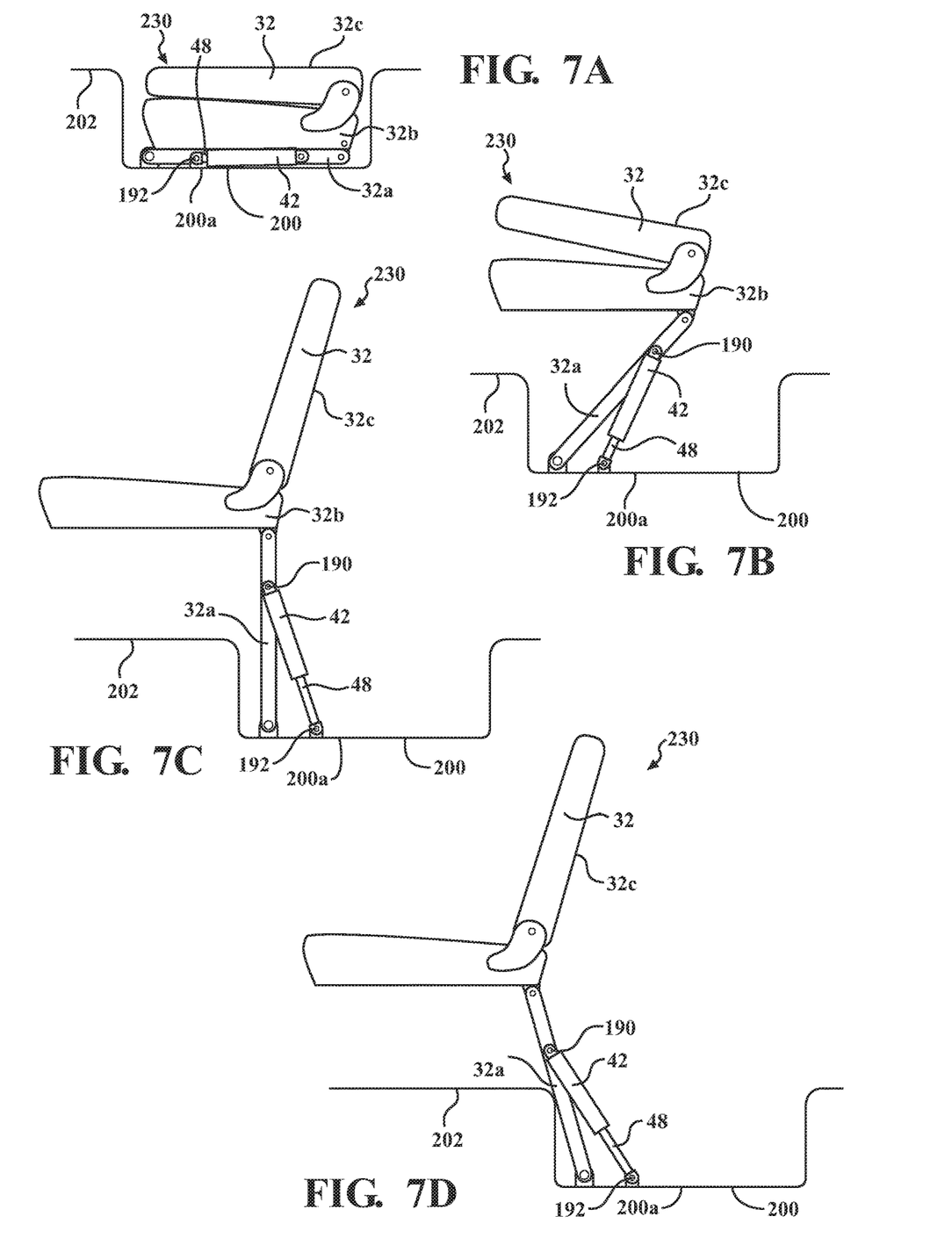
FIG. 7A is a schematic side view of another of an embodiment of a seat assembly for a vehicle, shown in a stowed configuration in a cavity formed in a floor of a vehicle cargo bed.
FIG. 7B is the schematic side view of FIG. 7A showing rotation of the base, bottom, and back portions the seat relative to each other as the seat is deployed.
FIG. 7C is the schematic side view of FIG. 7A showing rotation of the portions of the seat to a further stage of deployment.
FIG. 7D is the schematic side view of FIG. 7A showing the portions of the seat when the seat is fully deployed.

FIG. 7A is a schematic cross-sectional view of the seat embodiment 230, shown in a stowed configuration in a cavity formed in a floor of a vehicle cargo bed. FIG. 7B is the schematic side view of FIG. 7A showing rotation of the base, bottom, and back portions the seat relative to each other as the seat is deployed. FIG. 7C is the schematic side view of FIG. 7A showing rotation of the portions of the seat to a further stage of deployment. FIG. 7D is the schematic side view of FIG. 7A showing the portions of the seat when the seat is fully deployed. FIGS. 7A-7D also show how the shaft 48 progressively extends from the housing (as shown in FIGS. 3A-3D and FIGS. 6A-6D) as the seat 32 is moved from the stowed configuration to the deployed configuration.

Figure 8A:
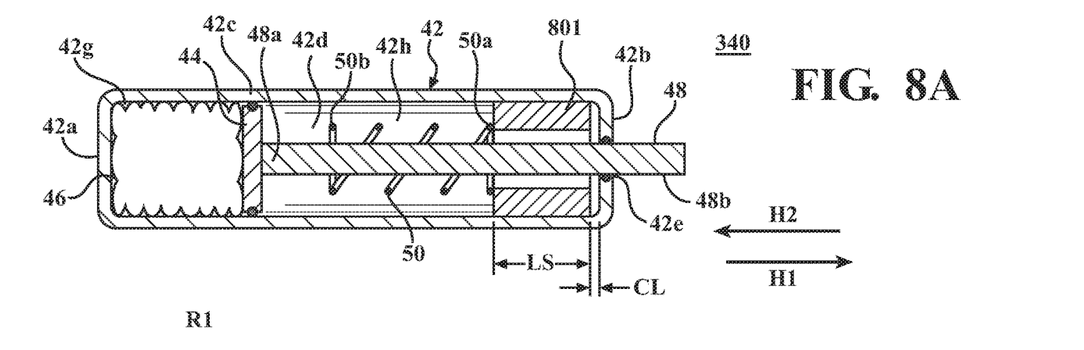
FIG. 8A is a schematic cross-sectional view of an actuation assist mechanism in accordance with another embodiment described herein including a force adjustment mechanism, and showing a compressible fluid of the actuation assist mechanism at full compression prior to initiating movement of the seat from the stowed configuration to the deployed configuration, and when the compressed fluid is generating the maximum assist force which may be generated by compressing the fluid.
Figure 8B:
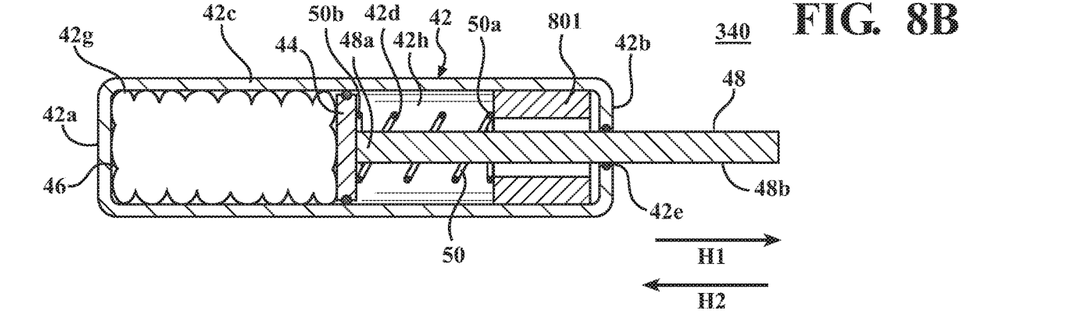
FIG. 8B is the view of FIG. 8A showing movement of a piston and shaft of the actuation assist mechanism after initiating movement of the seat from the stowed configuration to the deployed configuration, to where the piston has moved into contact with the spring member and begins to compress the spring member.
Figure 8C:
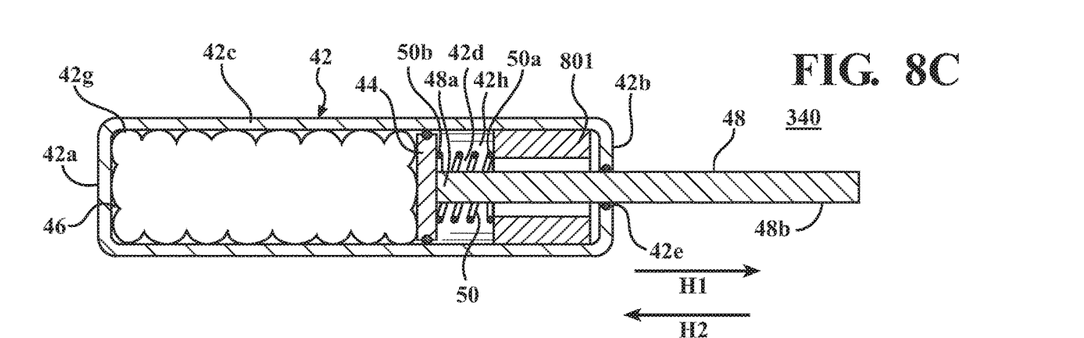
FIG. 8C is the view of FIG. 8A showing the spring member at full compression and generating the maximum assist force which may be generated by compressing the spring member.

FIGS. 8A-8C show an embodiment 340 of the seat actuation assist mechanism similar in structure and operation to the embodiment shown in FIGS. 3A-3D. Referring to FIGS. 8A-8C, an embodiment of an assist force adjustment mechanism may be incorporated into the seat actuation assist mechanism 340. The assist force adjustment mechanism may be positioned and structured to modify an assist force generated by the seat actuation assist mechanism.

In one or more arrangements, the force adjustment mechanism may be in the form of a sleeve or ring 801 positionable between an end closure 42b of the housing 42 and the spring member 50 as shown in FIGS. 8A-8C. In some arrangements, the force adjustment mechanism 801 may be positioned to abut the end closure 42b of the housing 42 as shown in FIGS. 8A-8C, and to space the spring member 50 apart from the end closure 42b. This arrangement of the force adjustment mechanism 801 may have the effect of changing the point along the stroke of the piston 44 at which the oppositely-acting assist force begins to be generated (as shown, for example, by location 504' of FIG. 5). This arrangement may use the same spring member 50 to provide the same assist force in direction H2 (at 506' in FIG. 5) as the embodiment shown in FIGS. 3A-3D, but over a shorter stroke of the piston shaft.

For example, as shown in FIG. 8A, spring member 50 may abut force adjustment mechanism 801. In FIG. 8B, piston 44 has moved into contact with spring member 50 and begins to compress the spring member as shown in FIG. 8C. However, because the location of the spring member has moved, the distance that the piston 44 moves before contacting the spring member 50 has effectively been reduced by the length of the force adjustment mechanism 801. This arrangement enables the stroke length of the piston shaft to be reduced by the length LS of the sleeve 801 (plus any clearance or space CL between the sleeve 801 and the end of the housing) while spring member 50 still provides the same assist force in direction H2.

Figure 9:
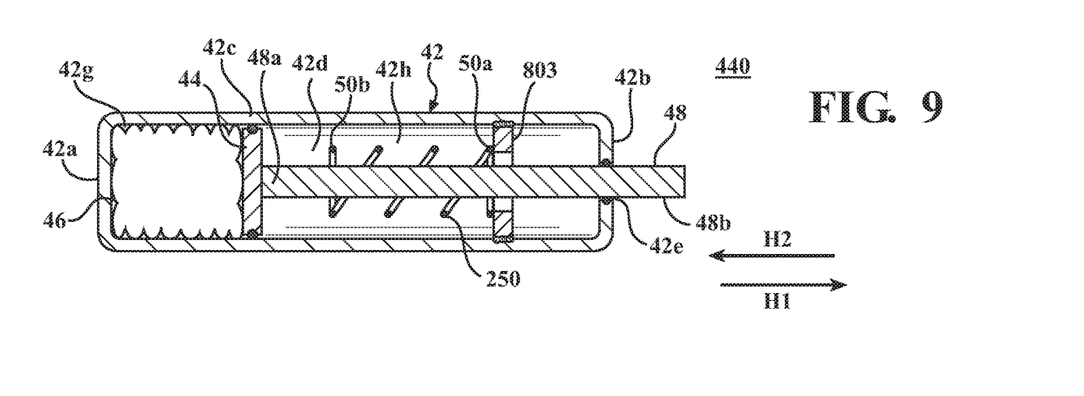
FIG. 9 is a schematic cross-sectional view of an actuation assist mechanism in accordance with another embodiment described herein, including another embodiment of a force adjustment mechanism.

Referring to FIG. 9, in an arrangement 440 of the seat actuation assist mechanism similar to that shown in FIG. 8A, the same effects on the spring member 50 as shown in FIGS. 8A-8C may be achieved by welding or otherwise suitably attaching a force adjustment mechanism ring 803 to the wall 42c of the housing 42 at any desired location, to enable relocation of the spring member 50 within the housing 42 as previously described.

Figure 10A:
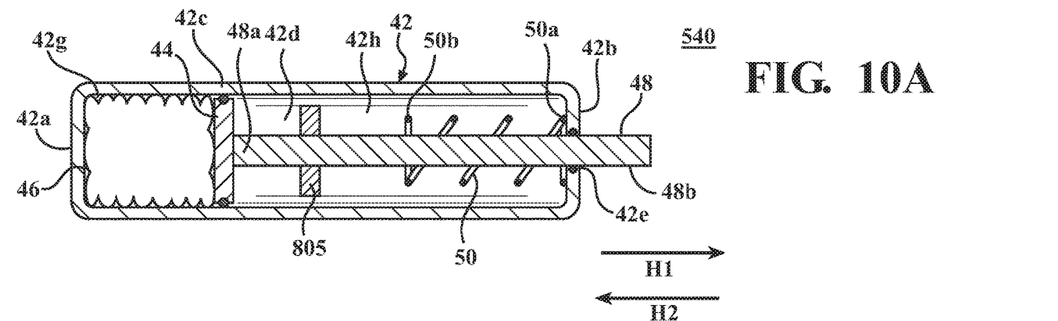
FIG. 10A is a schematic cross-sectional view of an actuation assist mechanism in accordance with another embodiment described herein including another embodiment of a force adjustment mechanism, and showing a compressible fluid of the actuation assist mechanism at full compression prior to initiating movement of the seat from the stowed configuration to the deployed configuration, and when the compressed fluid is generating the maximum assist force which may be generated by compressing the fluid.
Figure 10B:
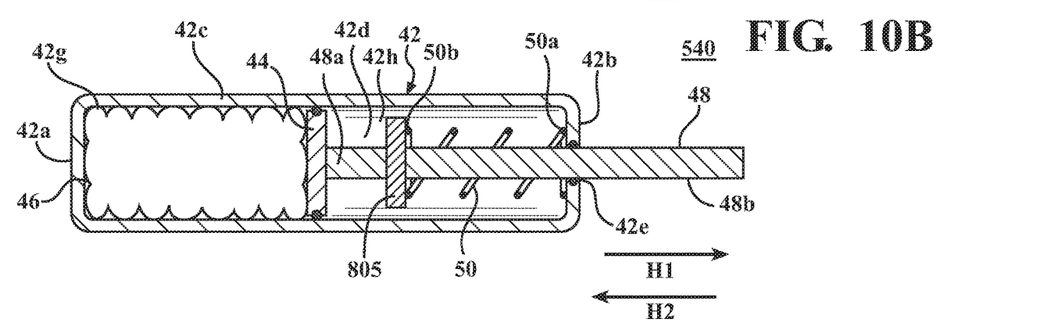
FIG. 10B is the view of FIG. 10A showing movement of a piston and shaft of the actuation assist mechanism after initiating movement of the seat from the stowed configuration to the deployed configuration, to where the force adjustment mechanism has moved into contact with the spring member and begins to compress the spring member.

Referring to FIGS. 10A and 10B, in yet another arrangement 540 of the seat actuation assist mechanism, an embodiment 805 of the force adjustment mechanism may be attached to a specific location along the piston shaft 48 spaced apart from the piston 44. FIG. 10A shows the fluid 46 at maximum compression, with the force adjustment mechanism 805 spaced apart from the spring member 50. FIG. 10B shows movement of the piston 44 in direction H1 as previously described with respect to FIGS. 3A-3D to a point where the force adjustment mechanism 805 contacts the spring member 50. As the piston 44 moves in direction H1, the force adjustment mechanism 805 contacts the spring member 50 first instead of the piston 44. The position of the force adjustment mechanism 805 along the piston shaft 48 may be specified so that the force adjustment mechanism 805 compresses the spring member 50 the same amount the piston 44 would have without the force adjustment mechanism, but over a shorter stroke length of the piston shaft 48. This arrangement may also be used to provide the same assist force in direction H2 as the embodiment shown in FIGS. 3A-3D, but over a shorter stroke length of the piston shaft.

Figure 11A:
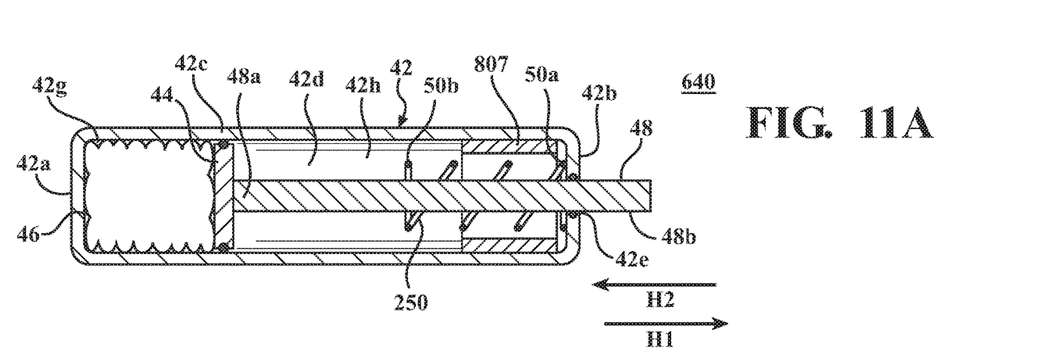
FIG. 11A is a schematic cross-sectional view of an actuation assist mechanism in accordance with another embodiment described herein including another embodiment of a force adjustment mechanism, and showing a compressible fluid of the actuation assist mechanism at full compression prior to initiating movement of the seat from the stowed configuration to the deployed configuration, and when the compressed fluid is generating the maximum assist force which may be generated by compressing the fluid.
Figure 11B:
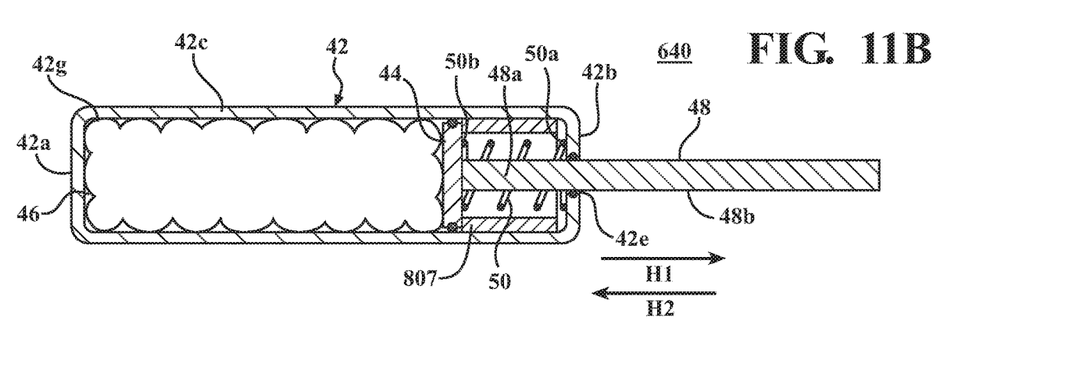
FIG. 11B is the view of FIG. 11A showing movement of a piston and shaft of the actuation assist mechanism after initiating movement of the seat from the stowed configuration to the deployed configuration, and showing the spring member at its full available compression with a stroke of the piston restricted by the force adjustment mechanism.

Referring to FIGS. 11A and 11B, in another arrangement 640 of the seat actuation assist mechanism, an embodiment 807 of a force adjustment mechanism may be positioned between the piston 44 and an end closure 42b of the housing 42 in a manner similar to that shown in FIGS. 8A-8C. However, this embodiment of the force adjustment mechanism may be structured to receive or enclose therein a portion of the spring member 50 and to allow the spring member to be compressed within the force adjustment mechanism. FIG. 11A shows the fluid 46 at maximum compression and a portion of the spring member 50 extending out from an interior of the force adjustment mechanism 807. FIG. 11B shows the piston moved in direction H1 so as to compress the spring member 50 until the piston 44 contacts the force adjustment mechanism 807, at which point the force adjustment mechanism 807 acts as a hard stop for the piston 44, preventing the spring member 50 from being compressed to the degree that it would be compressed without the force adjustment mechanism. Using this arrangement, both the stroke length and the assist force in direction H2 may be reduced from values they would otherwise have in the absence of the force adjustment mechanism 807. This ability to vary the stroke length and (correspondingly) the assist force may enable a seat actuation assist mechanism of a certain size to be used both in applications requiring a relatively higher assist force and in applications requiring a relatively lower assist force.

In alternative arrangements (not shown), by maintaining an existing piston stroke length and positioning a force adjustment mechanism so as to move the same spring member closer to the piston within the housing, the same stroke length of the piston shaft may compress the spring member to a greater degree that it would without the force adjustment mechanism. In such an arrangement, the positioning of the force adjustment mechanism may be used to increase the assist force for a given stroke length by increasing the amount by which the spring member may be compressed for the given stroke length. For example, if a force adjustment mechanism is interposed between the spring member and an end closure of the housing as shown in FIGS. 8A-8C, the effect may be to relocate the spring member closer to the piston. If the piston shaft then maintains the same stroke length, the spring member will be compressed between the force adjustment mechanism and the piston to a greater degree than it would if the force adjustment mechanism were not used. This greater compression may generate a greater assist force from the spring member.

In an additional embodiment (not shown), in a manner similar to that shown in FIGS. 11A-11B, a force adjustment mechanism similar to mechanism 807 of FIGS. 11A-11B may be incorporated into the seat actuation assist mechanism between the piston 44 and the end closure 42a (i.e., in the chamber 42g with the compressed gas 46) in a seat actuation assist mechanism arrangement as shown in FIGS. 3A-3D or 6A-6D, so that the piston will abut the force adjustment mechanism when moving in direction H2. This may have the effect of limiting both the stroke length in direction H2 and the assist force in direction H1 (by limiting compression of the gas 46).

It may be seen that embodiments of the force adjustment mechanism described herein may enable the assist forces generated using a given stroke length and housing structure to be controlled to some degree without changing parameters such as stroke length, housing size, and spring member characteristics.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A seat assembly for a vehicle, the seat assembly comprising:
   a foldable seat actuatable at least to a stowed configuration and to a deployed configuration; and
   a seat actuation assist mechanism structured to generate a seat actuation assist force, the mechanism including:
   a housing defining an interior of the housing;
   a piston movably positioned in the housing interior so as to form a fluid-tight seal with the housing;
   a compressible fluid confined within in the housing interior between the piston and a portion of the housing; and
   at least one spring member positioned in the housing interior,
   the mechanism being structured so that a movement of the seat from one of the stowed configuration and the deployed configuration to the other one of the stowed configuration and the deployed configuration causes the piston to compress the compressible fluid to a full compression so as to generate a first assist force exerted on the piston by the compressible fluid, the first assist force facilitating a movement of the seat from the other one of the stowed configuration and the deployed configuration to the one of the stowed configuration and the deployed configuration, after the seat has been moved to the other one of the stowed configuration and the deployed configuration,
   the mechanism also being structured so that a movement of the seat from the other one of the stowed configuration and the deployed configuration to the one of the stowed configuration and the deployed configuration causes the piston to act on the at least one spring member so as to generate a second assist force exerted on the piston by the at least one spring member, the second assist force facilitating a movement of the seat from the one of the stowed configuration and the deployed configuration to the other one of the stowed configuration and the deployed configuration, after the seat has been moved to the one of the stowed configuration and the deployed configuration.

2. The seat assembly of claim 1 wherein the compressible fluid is positioned in the housing interior on a first side of the piston, and the at least one spring member is positioned in the housing interior on the first side of the piston and is connected to the piston and to a portion of the housing.

3. The seat assembly of claim 2 wherein the at least one spring member is connected to the piston and to a portion of the housing and is structured to be unstretched between the piston and the portion of the housing when the piston is compressing the compressible fluid to the full compression so as to generate the first assist force, and wherein the at least one spring member is structured to begin to stretch between the piston and the portion of the housing to which the spring member is connected after a movement of the piston a predetermined distance in a direction away from the portion of the housing to which the spring member is connected, so as to generate the second assist force.

4. The seat assembly of claim 1 wherein the spring member is a coil spring member.

5. The seat assembly of claim 1 wherein the piston resides at a first location within the housing interior when the piston is compressing the compressible fluid to a full compression, wherein the at least one spring member is positioned in the housing interior at a second location spaced apart from the first location when the piston is compressing the compressible fluid to a full compression, and wherein the piston must move a distance from the first location to the second location before beginning to act on the at least one spring member so as to generate the second assist force exerted on the piston by the at least one spring member.

6. The seat assembly of claim 5 further comprising a force adjustment mechanism positioned between the at least one spring member and an end closure of the housing, and structured to come into contact with the at least one spring member during movement of the seat from one of the stowed configuration and the deployed configuration to the other one of the stowed configuration and the deployed configuration.

7. The seat assembly of claim 6 wherein the force adjustment mechanism is secured to a wall of the housing.

8. The seat assembly of claim 5 further comprising a force adjustment mechanism positioned between the piston and the at least one spring member, and structured to come into contact with the at least one spring member during movement of the seat from one of the stowed configuration and the deployed configuration to the other one of the stowed configuration and the deployed configuration.

9. The seat assembly of claim 8 wherein the force adjustment mechanism is secured to a piston shaft connected to the piston.

10. The seat assembly of claim 5 further comprising a force adjustment mechanism positioned within the housing and structured to receive a portion of the at least one spring member therein, the force adjustment mechanism being structured to come into contact with the piston and to restrict movement of the piston within the housing during movement of the seat from one of the stowed configuration and the deployed configuration to the other one of the stowed configuration and the deployed configuration.

11. A seat assembly for a vehicle, the seat assembly comprising:
a foldable seat actuatable at least to a stowed configuration and to a deployed configuration; and
a seat actuation assist mechanism operatively coupled to the seat and structured to generate seat actuation assist forces to assist in moving the seat from the stowed configuration to the deployed configuration and from the deployed configuration to the stowed configuration, the seat actuation assist mechanism comprising:
a housing defining an interior of the housing;
a piston movably positioned in the housing interior so as to form a fluid-tight seal with the housing;
a compressible fluid confined within in the housing interior between the piston and a portion of the housing; and
at least one spring member positioned in the housing interior,
the piston being movable to a first position in which the piston compresses the compressible fluid to a full compression so as to generate a first assist force exerted on the piston by the compressible fluid when the seat is in one of the stowed configuration and the deployed configuration,
the piston also being movable to a second position in which the piston exerts a force on the at least one spring member so as to generate a second assist force exerted on the piston as a reaction force by the at least one spring member, when the seat is in the other one of the stowed configuration and the deployed configuration,
at least one of the piston and the housing being coupled to the seat such that the first assist force and the second assist force are transferred to the seat.

12. The seat assembly of claim 11 wherein the piston is spaced apart from the at least one spring member when the piston is in the first position, and wherein the reaction force exerted by the at least one spring member on the piston is generated by compression of the at least one spring member by the piston.

13. The seat assembly of claim 11 wherein the piston is attached to the at least one spring member, and wherein the reaction force exerted by the at least one spring member on the piston is generated by tensioning of the at least one spring member by movement of the piston to the second position.

14. A seat actuation assist mechanism structured to generate seat actuation assist forces for a foldable vehicle seat actuatable to a stowed configuration and to a deployed configuration, the seat actuation assist mechanism comprising:
a housing defining an interior of the housing;
a piston movably positioned in the housing interior so as to form a fluid-tight seal with the housing;
a compressible fluid confined within in the housing interior between the piston and a portion of the housing; and
at least one spring member positioned in the housing interior,
the piston being movable to a first position in which the piston compresses the compressible fluid to a full compression so as to generate a first actuation assist force exerted on the piston by the compressible fluid,
the piston also being movable to a second position in which the piston exerts a force on the at least one spring member so as to generate a second actuation assist force exerted on the piston as a reaction force by the at least one spring member.

* * * * *